United States Patent [19]

Kasahara

[11] Patent Number: 4,861,665
[45] Date of Patent: Aug. 29, 1989

[54] ELECTROSTATIC ABSORPTION SHEET

[75] Inventor: Keiji Kasahara, Kakegawa, Japan

[73] Assignee: Abisare Co., Ltd., Shizuoka, Japan

[21] Appl. No.: 186,189

[22] Filed: Apr. 26, 1988

[30] Foreign Application Priority Data

Feb. 5, 1988 [JP] Japan .............................. 63-14692[U]

[51] Int. Cl.$^4$ ......................... B32B 9/04; H02N 13/00
[52] U.S. Cl. .................................. 428/411.1; 428/41;
428/215; 428/413; 428/408; 428/516; 428/520;
428/518; 428/442; 428/424.6; 428/424.4;
428/441; 428/430; 428/295; 204/290 R
[58] Field of Search ........................ 428/411.1, 41, 215

[56] References Cited

U.S. PATENT DOCUMENTS 4,698,256 10/1987 Giglia et al. ........................ 428/412

FOREIGN PATENT DOCUMENTS 57-58872 11/1982 Japan .

OTHER PUBLICATIONS

Rogers, J. L., "Controlling Static Electricity in PVC Packaging", Journal of Vinyl Technology, Jun. 1984, vol. VI, No. 2.

Primary Examiner—P. C. Ives
Attorney, Agent, or Firm—Klauber & Jackson

[57] ABSTRACT

This invention relates to an electrostatic absorption sheet having an absorption layer, a group of electrodes and an insulation layer integrally connected to each other, wherein the insulation layer is formed by an insulation material having an adhering characteristic and then the insulation layer is reinforced by a core member.

2 Claims, 1 Drawing Sheet

ELECTROSTATIC ABSORPTION SHEET

DETAILED DESCRIPTION OF THE INVENTION

1. Industrial Field of Utilization

This invention relates to an electrostatic absorption sheet of synthetic resin for use in absorbing and holding a sheet or a film by utilizing electrostatic forces.

2. Prior Art

In the conventional kind of this absorption sheet, three layers of an absorption layer, a group of electrodes and an insulation layer are adhered to each other through a thermal adhesion and the like so as to make an integrally connected structure (for example, see Jap. Pat. Publn. No. 57-58872).

The absorption layer is a surface sheet such as a plastic sheet having a semi-conductive characteristic, and the insulation layer is a base plate sheet of plastic which can thermally be adhered to the absorption layer and as its material, an insulation material having no adhesive characteristic, for example, a chloride vinyl and the like is applied.

Problems to be Resolved by the Invention

According to the above-described conventional type of structure, the insulation layer has no adhesive characteristic, so that an adhesion between the insulative layer and the absorption layer must be carried out with a thermal adhesion or a supersonic welding, resulting in that its manufacturing step requires a troublesome operation and further its facility for manufacturing and thus a costly expensive manufacturing is required. Further, in order to mount and fix the absorption sheet to an equipment such as an automatic drawing machine, a double-surface adhesive tape is adhered to the lower surface of the insulation layer and then the absorption sheet is closely adhered and fixed to the equipment through the adhesive tape.

Thus, it is an object of the present invention to provide a less-expensive adhesion tape which is superior in its manufacturing characteristic and utilization in order to eliminate the above-described disadvantages of the conventional type of the invention.

Means for Accomplishing the Subject Issue

The feature of the present invention consists in that an insulation layer to be adhered and connected to the absorption layer is formed by an insulation material having an adhesive characteristic, adhered to the absorption layer through a self-adhesion characteristic and closely adhered and fixed to the desired surface of the equipment to be used.

DESCRIPTION OF THE PREFERRED EMBODIMENT

Figure 1:
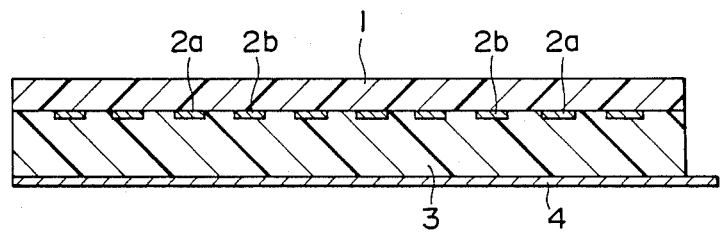
FIG. 1 is a sectional view for showing an absorption sheet of the present invention.

Referring now to the drawings, one preferred embodiment of the present invention will be described. In FIG. 1, a reference numeral 1 denotes a surface sheet for forming an absorption layer, 2a and 2b denote a group of electrodes formed or adhered at or to the lower surface of the surface sheet 1, and 3 indicates a base plate sheet forming an insulative layer.

The surface sheet 1 is made of a plastic sheet which is known as an absorption layer, for example, synthetic resin of vinyl chloride, acryl resin and styrol resin and as required a carbon material or synthetic rubber and the like are mixed to each other to get a proper rate of electric resistance or a rate of induction. An absorption power is generated at the surface when an electric charge with high voltage and high current is applied to the electrodes 2a and 2b.

As the surface sheet 1, a sheet disclosed in the previous patent application of the applicant (Jap. Pat. Appln. No. 63-11496) i.e. a sheet having as its major constituent a thermoplastic synthetic resin and a thermoplastic elastomer may be used.

The base plate sheet 3 is formed by an insulation material having an adhesive characteristic, its material is, for example, acryl resin, urethane resin, olefin resin and epoxy resin adhesive agent. Its viscosity (a normal adhering power) is more than 1000 g/cm in case of copolymer of acrylic acid alkyl ester and a volumetric intrinsic resistance is more than $10^{12}$ to $10^{18}$ $\Omega$cm.

This base plate sheet 3 is handled in such a way as the peeling-off sheets 4 are covered on both front and rear surfaces thereof before adhering to the surface sheet 1, then in case that the same is adhered to the surface sheet 1, the peeling-off sheet at the front surface is peeled off, the corresponding surface is adhered to the surface sheet 1 with a pressing roll to cause both sheets 1 and 3 and the group of electrodes 2a and 2b to be integrally connected.

An example of a thickness of each of the sheets 1 and 3 is as follows. A thickness of the surface sheet 1 is about 0.2 to 1.5 mm and a thickness of the base plate sheet 3 is about 0.02 to 1.5 mm.

Figure 2:
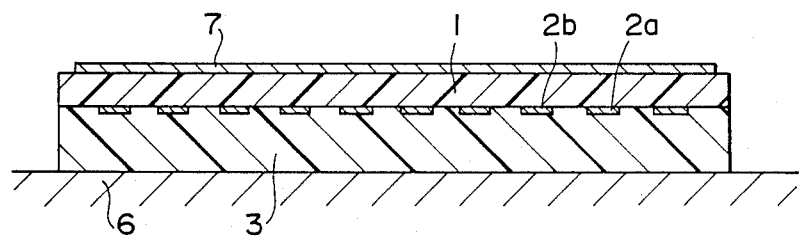
FIG. 2 is a sectional view for showing an applied state of the present invention.

FIG. 2 illustrates an example of use if the absorption sheet of the present invention and in case that the absorption sheet is mounted and fixed to an equipment 6 such as an automatic drawing machine and the like, at first the peeling-off sheet 4 is peeled off from the base plate sheet 3 and the lower surface of the sheet is mounted on and pressed against the equipment 6 to cause the base plate sheet 3 to be entirely and closely adhered to the equipment 6 due to its self-adhesive characteristic.

In FIG. 2, a reference numeral 7 designates an item to be absorbed.

Figure 3:
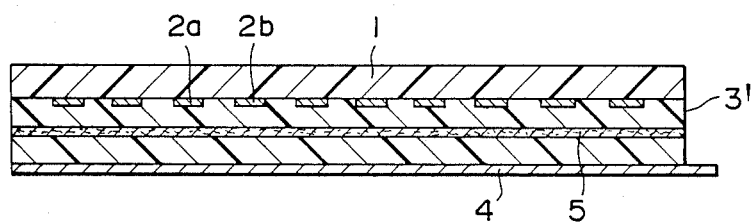
FIG. 3 is a sectional view for showing another preferred embodiment of the present invention.

FIG. 3 illustrates another preferred embodiment of an absorption sheet of the present invention in which the base plate sheet 3' is reinforced by a core member 5.

The core member 5 is made of a synthetic resin film or non-woven fabric, glass fiber and the like, wherein the above-described insulation material having an adhesive characteristic is coated on both front and rear surfaces thereof to form a base sheet 3', thereby the sheet is reinforced.

Actions and Effects

In accordance with thee present invention, since the insulation layer of the absorption sheet is formed by the insulation material having an adhesive characteristic, it is possible to adhere the insulation layer to the absorption layer through its self-adhering power.

Therefore, the absorption layer and the insulation layer are adhered with a simple pressing method without requiring any expensive facility such as a thermal pressing machine, a supersonic welding machine and the like, and its workability can be improved and its manufacturing cost can be reduced.

Further it is possible to mount and adhere the absorption sheet to the desired fixing surface of the equipment to be used through a self-adhering power of the insulation layer.

Therefore, the double-surface adhesive tape can be eliminated and a fixing operation of the adhesive tape is simplified and at the same time the entire sheet surface is closely contacted with the fixing surface so as to form a rigid fixing structure.

Thus, the absorption sheet is reinforced with a core buried structure and its durability and handling characteristic can be improved.

Thus, an insulation layer and an absorption layer are adhered under their normal temperatures without requiring any thermal adhesion or ultrasonic welding, so that the thickness of the absorption layer can be reduced down to about 0.2 mm and so a high absorption power can be obtained.

What is claimed is:

1. An electrostatic absorption sheet in which an absorption layer, a group of electrodes and an insulation layer are integrally connected to each other by a method wherein said insulation layer is formed by an insulation material having an adhesive characteristic which permits adhering of the insulation layer to the absorption layer solely by means of pressure.

2. An electrostatic absorption sheet as set forth in claim 1 in which said insulation layer is reinforced by a core member.

* * * * *